US008754157B2

(12) United States Patent
Furukawa et al.

(10) Patent No.: US 8,754,157 B2
(45) Date of Patent: Jun. 17, 2014

(54) COVERING MATERIAL FOR ELECTRIC WIRE

(75) Inventors: Toyoki Furukawa, Yokkaichi (JP); Masashi Sato, Yokkaichi (JP); Masahiro Nakamura, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 35 days.

(21) Appl. No.: 13/395,568

(22) PCT Filed: May 27, 2011

(86) PCT No.: PCT/JP2011/062168
§ 371 (c)(1),
(2), (4) Date: Mar. 12, 2012

(87) PCT Pub. No.: WO2011/152295
PCT Pub. Date: Dec. 8, 2011

(65) Prior Publication Data

US 2012/0172511 A1 Jul. 5, 2012

(30) Foreign Application Priority Data

Jun. 4, 2010 (JP) ................................ 2010-128521

(51) Int. Cl.
*C08K 3/32* (2006.01)
*C08K 3/40* (2006.01)
*C08K 3/22* (2006.01)
*C08L 57/08* (2006.01)
*C08L 27/06* (2006.01)

(52) U.S. Cl.
USPC ........... 524/295; 524/296; 524/567; 524/569; 525/331.5

(58) Field of Classification Search
CPC ............. C08K 3/32; C08K 3/22; C08K 3/40; C08L 27/06; C08L 57/08
USPC ........ 524/394, 296, 295, 567, 569; 525/331.5
See application file for complete search history.

(56) References Cited

U.S. PATENT DOCUMENTS 5,013,782 A * 5/1991 Tateno .......................... 524/417

FOREIGN PATENT DOCUMENTS

| | | | |
|---|---|---|---|
| CN | 101353467 A | | 1/2009 |
| CN | 101412834 A | | 4/2009 |
| JP | A-61-133507 | | 6/1986 |
| JP | A-04-206312 | | 7/1992 |
| JP | A-06-223630 | | 8/1994 |
| JP | A-07-188488 | | 7/1995 |
| JP | A-11-140263 | | 5/1999 |
| JP | 2001335668 | * | 12/2001 |
| JP | A-2002-322330 | | 11/2002 |
| JP | A-2009-126963 | | 6/2009 |

OTHER PUBLICATIONS

International Search Report issued in International Application No. PCT/JP2011/062168 Dated Aug. 9, 2011 (with trans).
Jan. 14, 2014 Office Action issued in German Application No. 11 2011 100 052.9 with English-language translation.
Dec. 20, 2013 Notification of the First Office Action issued in Chinese Application No. 201180004218.9 with English-language translation.

* cited by examiner

*Primary Examiner* — James J Seidleck
*Assistant Examiner* — Deve E Valdez
(74) *Attorney, Agent, or Firm* — Oliff PLC

(57) ABSTRACT

A polyvinyl chloride-type covering material for electric wire that has an excellent damage-resistance property, cold-resistance property and low-temperature property after aging. The covering material containing a polyvinyl chloride comprises, with respect to 100 parts by mass of the polyvinyl chloride, (A) 15 to 30 parts by mass of a plasticizer comprising 15 parts by mass or more of one or more plasticizers selected from trimellitate plasticizers and pyromellitate plasticizers, (B) 2 to 10 parts by mass of a chlorinated polyolefin, and (C) 1 to 6 parts by mass of a methyl methacrylate-butadiene-styrene copolymer.

3 Claims, 3 Drawing Sheets

COVERING MATERIAL FOR ELECTRIC WIRE

TECHNICAL FIELD

The present invention relates to a covering material for electric wire, and more specifically relates to a polyvinyl chloride-type covering material suitably used as a covering material of an electric wire that is routed in a vehicle such as an automobile.

BACKGROUND ART

Conventionally, a covering material for electric wire is known, that is made from a polyvinyl chloride-containing composition, which is a composition containing a polyvinyl chloride. A plasticizer is usually contained in this kind of covering material to impart flexibility to the covering material.

As an example of such a covering material, PTL1 discloses a covering material made from a polyvinyl chloride composition that contains a plasticizer and at least one of a polyester elastomer and a methyl methacrylate-butadiene-styrene. As another example, PTL2 discloses a covering material made from a polyvinyl chloride composition that contains a chlorinated polyethylene.

CITATION LIST

Patent Literature

PTL1: JP H06-223630 A
PTL2: JP H04-206312 A

SUMMARY OF INVENTION

Technical Problem

As a covering material for electric wire made from a polyvinyl chloride-containing composition, a covering material having excellent flexibility can be provided by containing a increased amount of a plasticizer. However, when an increased amount of plasticizer is contained in the composition, an external damage would more probably deteriorate a wire covering made of the composition, whereby damage resistance of the wire covering tends to be decreased. Especially, in recent years, weight reduction of a vehicle such as an automobile is required and an electric wire routed therein is required to have a thinner covering. Since a thinner covering would further decrease damage resistance of the wire covering, a damage-resistance property of a covering material becomes increasingly critical.

On the other hand, a decreased amount of a plasticizer contained tends to increase damage resistance of a wire covering, but it tends to decrease cold resistance of the wire covering. In addition, since an electric wire routed in a vehicle such as an automobile may be subjected to a high temperature depending on the space in which it is routed, a low-temperature property of the wire covering after heat aging is also important.

Under such a condition, it has been difficult for a polyvinyl chloride-containing composition to have both damage resistance and cold resistance by adjusting only the amount a plasticizer. Also by using the covering materials disclosed in PTL 1 and PTL2, it was difficult to achieve both damage resistance and cold resistance. No covering material for electric wire made from a polyvinyl chloride-containing composition has been found that has a sufficient low-temperature property after aging in addition to the damage resistance and cold resistance.

An object of the present invention is to provide a polyvinyl chloride-type covering material for electric wire that has an excellent damage-resistance property, an excellent cold-resistance property, and an excellent low-temperature property after aging.

Solution to Problem

To achieve the objects and in accordance with the purpose of the present invention, a covering material for electric wire containing a polyvinyl chloride according to a preferred embodiment of the present invention comprises, with respect to 100 parts by mass of the polyvinyl chloride, (A) 15 to 30 parts by mass of a plasticizer comprising 15 parts by mass or more of one or more plasticizers selected from trimellitate plasticizers and pyromellitate plasticizers, (B) 2 to 10 parts by mass of a chlorinated polyolefin, and (C) 1 to 6 parts by mass of a methyl methacrylate-butadiene-styrene copolymer, wherein a total amount of the component (B) and the component (C) is 3 to 12 parts by mass.

The component (A) preferably includes 10 parts by mass or less of an aliphatic plasticizer with respect to 100 parts by mass of the polyvinyl chloride.

Alternatively, the component (A) preferably includes 10 parts by mass or less of one or more plasticizers selected from phthalate plasticizers and aliphatic plasticizers with respect to 100 parts by mass of the polyvinyl chloride.

Advantageous Effects of Invention

Containing the specific amounts of the components (A) to (C), and the total amount of the components (B) and (C) being within the specific range, the covering material for electric wire according to the preferred embodiment of the present invention has an excellent damage-resistance property, an excellent cold-resistance property, and an excellent low-temperature property after aging.

If the component (A) includes the specific amount of the aliphatic plasticizer, the covering material has a more excellent cold-resistance property.

If the component (A) includes the specific amount of one or more plasticizers selected from phthalate plasticizers and aliphatic plasticizers, the covering material has an excellent cold-resistance property, wear-resistance property, and an excellent damage-resistance property simultaneously.

DESCRIPTION OF EMBODIMENTS

Figure 1A:
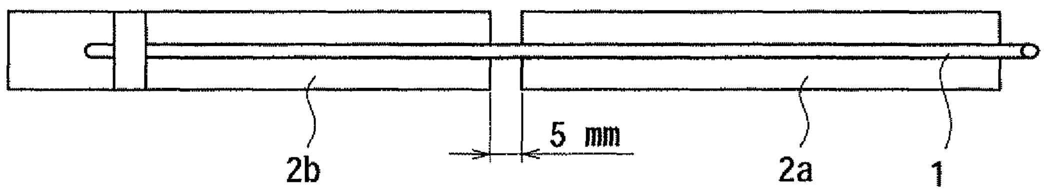
FIG. 1 is a view illustrating a method for evaluating damage resistance.

A detailed description of preferred embodiments of the present invention will now be provided. A covering material for electric wire according to the preferred embodiment of the present invention is made from a composition that contains a plasticizer (A), a chlorinated polyethylene (B), and a methyl methacrylate-butadiene-styrene copolymer in addition to a polyvinyl chloride. The covering material according to the preferred embodiment of the present invention is a composition that contains the polyvinyl chloride and the component (A), in which both the components (B) and (C) are contained, the contents of the components (A) to (C) are in respective specific ranges and the total amount of the components (B) and (C) is within a specific range.

A polymerization degree of the polyvinyl chloride as a base resin, which is not limited specifically, is preferable 800 or larger in view of suppression of decrease in improvement effect on damage resistance of the covering material which is brought by mixing of a specific amounts of the components (B) and (C) in the composition containing the specific amount of the component (A). On the other hand, the polymerization degree is preferably 2800 or less in view of suppression of decrease in mixing property of the polyvinyl chloride with the other components. The polymerization degree is more preferably within a range of 1300 to 2500.

The content of the plasticizer (A) is within a range of 15 to 30 parts by mass with respect to 100 parts by mass of the polyvinyl chloride. This is because if the content is less than 15 parts by mass, the covering material could not have a sufficient cold-resistance property. In addition, a workability of an electric wire including the covering material could be so insufficient that a fringe could be formed when the wire covering is stripped off for processing an end portion of a wire. On the other hand, if the content of the plasticizer is more than 30 parts by mass, the covering material could not have a sufficient damage-resistance property. It is to be noted that the cold-resistance property in the preferred embodiment of the present invention is defined both as a low-temperature brittle-resistance property and as low-temperature flexibility.

The plasticizer (A) includes 15 parts by mass or more of one or more plasticizers selected from trimellitate plasticizers and the pyromellitate plasticizers. This is because if the content of the specific plasticizers is less than 15 parts by mass, a smoking property of the covering material, which is defined as a property to suppress emission of smoke from the covering material when heated by an electric current through the conductor, could be lessened. In addition, long-term heat resistance, which is a property to deliver an excellent heat-resistance effect for a long term, could be lessened.

The plasticizer (A) may further include a plasticizer other than the trimellitate plasticizers or the pyromellitate plasticizers. Examples of the plasticizer other than them include phthalate plasticizers and aliphatic plasticizers. When the total content of the plasticizers included is within the specific range described above and the content of the specific plasticizers such as the trimellitate plasticizer is within the specific range described above, the characteristic effects of the preferred embodiment of the present invention are produced such as an excellent damage-resistance property, cold-resistance property, and low-temperature property after aging even if the plasticizer (A) includes the plasticizer other than the trimellitate plasticizers and pyromellitate plasticizers. In addition, in comparison with the plasticizer (A) that only includes one or more selected from the trimellitate plasticizers and the pyromellitate plasticizers, which are generally expensive, the plasticizer (A) that includes these specific kinds of plasticizers and the plasticizer other than them often requires a lower cost. It is to be noted that the low-temperature property after aging in the preferred embodiment of the present invention is defined as a low-temperature property after aging by heat.

The content of the plasticizer other than the specific plasticizers is preferably 10 parts by mass or less with respect to 100 parts by mass of the polyvinyl chloride. This is because if the content is more than 10 parts by mass, the smoking property of the covering material tends to be decreased. On the other hand, the lower limit of the content of the plasticizers other than the specific kinds of plasticizers, which is not limited specifically, is preferably 1 part by mass in view of sufficient effect of cost reduction for plasticizers. The content is more preferably 3 parts by mass or more.

In addition, when the plasticizer (A) includes an aliphatic plasticizer as the plasticizer other than the specific kinds of plasticizers, the cold-resistance property of the covering material is further improved. The content of the aliphatic plasticizer is preferably 10 parts by mass or less with respect to 100 parts by mass of the polyvinyl chloride. This is because if the content is 10 parts by mass or more, the smoking property of the covering material tends to be decreased. On the other hand, if the content is too little, the improvement effect on cold-resistance property is limited. In such a view, the content of the aliphatic plasticizer is at least 1 part by mass with respect to 100 parts by mass of the polyvinyl chloride. The content is more preferably 3 parts by mass or more.

The plasticizer (A) is preferably consists of one or more selected from the trimellitate plasticizers and the pyromellitate plasticizers, the content of the plasticizer (A) being 20 to 30 parts by mass with respect to 100 parts by mass of the polyvinyl chloride. Alternatively, the plasticizer (A) is preferably consists of one or more selected from the trimellitate plasticizers and the pyromellitate plasticizers and an aliphatic plasticizer, the amount of the plasticizer (A) being 20 to 30 parts by mass with respect to 100 parts by mass of the polyvinyl chloride. When the plasticizer (A) has one of these compositions, the cold-resistance property of the covering material is further improved.

The plasticizer (A) is more preferably consists of one or more selected from the trimellitate plasticizers and the pyromellitate plasticizers, the content of the plasticizer (A) being 20 to 25 parts by mass with respect to 100 parts by mass of the polyvinyl chloride. When the plasticizer (A) has this composition, the cold-resistance property and damage-resistance property of the covering material is further improved.

Examples of the trimellitate plasticizer include a trimellitate ester. Examples of the pyromellitate plasticizer include a pyromellitate ester. Examples of an alcohol composing the esters include a saturated aliphatic alcohol having a carbon number of 8 to 13. They may be used singly or in combination.

Examples of the phthalate plasticizer include a phthalate ester. Examples of an alcohol composing the ester include a saturated aliphatic alcohol having a carbon number of 8 to 13. They may be used singly or in combination. More specifically, examples of the phthalate plasticizer include di-2-ethylhexyl phthalate, di-n-oxtyl phthalate, diisononyl phthalate, dinonyl phthalate, diisodecyl phthalate, and ditridecyl phthalate.

Examples of the aliphatic plasticizer include an adipate ester, a sebacate ester, and an azelate ester. Examples of an alcohol composing the esters include a saturated aliphatic alcohol having a carbon number of 3to 13. They may be used singly or in combination. More specifically, Examples of the aliphatic plasticizer include dioctyl adipate, isononyl adipate, dibutyl sebacate, dioctyl sebacate, and dioctyl azelate.

Examples of the chlorinatedpolyolefin (B) include a chlorinated polyethylene and a chlorinated polypropylene. Examples of the chlorinated polyethylene include a noncrystalline chlorinated polyethylene and a semicrystalline chlorinated polyethylene. They may be used singly or in combination.

The content of the chlorinated polyolefin (B) is within a range of 2 to 10 parts by mass with respect to 100 parts by mass of the polyvinyl chloride. This is because if the content is less than 2 parts by mass, the covering material could not have a sufficient cold-resistance property. On the other hand, if the content is more than 10 parts by mass, the covering material could not have a sufficient damage-resistance property.

The content of the component (B) with respect to 100 parts by mass of the polyvinyl chloride is preferably within a range of 4 to 8 parts by mass and more preferably within a range of 6 to 8 parts by mass.

The content of the methyl methacrylate-butadiene-styrene copolymer (C) is within a range of 1 to 6 parts by mass with respect to 100 parts by mass of the polyvinyl chloride. This is because if the content is less than 1 part by mass, the covering material could not have a sufficient cold-resistance property. On the other hand, if the content is more than 6 parts by mass, the covering material could not have a sufficient low-temperature property after aging. Further, if the content is more than 8 parts by mass, the covering material could not have a sufficient damage-resistance property.

The content of the component (C) with respect to 100 parts by mass of the polyvinyl chloride is preferably within a range of 2.5 to 5 parts by mass and more preferably within a range of 3 to 4 parts by mass.

The covering material for electric wire according to the preferred embodiment of the present invention is a composition containing the polyvinyl chloride in which both the component (B) and the component (C) are contained. A composition containing a polyvinyl chloride in which only the component (B) is contained or only the component (C) is contained could not have a sufficient damage-resistance property, cold-resistance property, and low-temperature property after aging simultaneously. The total content of the components (B) and (C) in the covering material according to the preferred embodiment of the present invention is within a range of 3 to 12 parts by mass with respect to 100 parts by mass of the polyvinyl chloride. This is because if the total content is less than 3 parts by mass, the covering material could not have a sufficient wear-resistance property or a sufficient cold-resistance property. On the other hand, if the total amount is more than 12 parts by mass, the covering material could not have a sufficient damage-resistance.

The total content of the components (B) and (C) with respect to 100 parts by mass of the polyvinyl chloride is preferably within a range of 4 to 10 parts by mass and more preferably in a range of 6 to 8 parts by mass.

The covering material for electric wire according to the preferred embodiment of the present invention may further contain an ingredient other than the polyvinyl chloride and the components (A) to (C) within a range of not impairing the object of the preferred embodiment of the present invention. Examples of the ingredient other than the polypropylene chloride and the components (A) to (C) include additives that are usually mixed in a covering material for electric wire such as a stabilizer, a pigment, an antioxidant, and a bulking filler.

The covering material according to the preferred embodiment of the present invention can be prepared by mixing the components (A) to (C) and the additive as necessary with the use into the polyvinyl chloride as s a base resin, and heat-kneading the mixture. A generally used kneader such as a Banbury mixer, a pressure kneader, a kneading extruder, a twin screw extruder and a roll can be used for the kneading. It is preferable that the ingredients are dry blended by using a tumbler before kneading. After the kneading, the composition is taken out of the kneader. The composition is preferably pelletized using a pelletizing machine.

Then, an insulated wire including the covering material according to the preferred embodiment of the present invention can be prepared by extrusion-covering a conductor with the prepared covering material.

The covering material that have the configuration described above, by containing the specific amounts of the chlorinated polyolefin (B) and the methyl methacrylate-butadiene-styrene copolymer (C), can hold a cold resistance without containing an increased amount of the plasticizer (A), whereby the covering material is not inferior in the damage-resistance property or low-temperature property after aging. Thus, the covering material described above has an excellent damage-resistance property, cold-resistance property, and low-temperature property after aging simultaneously.

EXAMPLE

A description of the present invention will now be specifically provided with reference to examples; however, the present invention is not limited thereto.

Example 1

(Preparation of Covering Material for Electric Wire)

A polyvinyl chloride composition according to Example 1 was prepared by kneading the ingredients shown in Table 1, 100 parts by mass of the polyvinyl chloride (polymerization degree: 1300), 20 parts by mass of the trimellitate ester, 4 parts by mass of the chlorinated polyethylene, 6 parts by mass of the methyl methacrylate-butadiene-styrene copolymer (MBS resin), and 5 parts by mass of the lead-free stabilizer, at a temperature of 180° C. using a single screw kneader, and pelletizing the mixture using a pelletizing machine.

(Preparation of Insulated Wire)

An insulated wire according to Example 1 was prepared by extrusion-molding the prepared polyvinyl chloride composition to have a covering thickness of 0.2 mm around a stranded conductor that has a cross sectional area of 0.35 $mm^2$.

(Evaluation)

Damage resistance, low-temperature embrittlement resistance, low-temperature flexibility, and low-temperature property after aging of the insulated wire according to Example 1 were evaluated in the procedures described below. Smoking property and workability of the insulated wire according to Example 1 were also evaluated in the procedures described below.

Examples 2 to 22

Insulated wires according to Examples 2 to 22 were prepared in the same manner as the insulated wire according to Example 1, by preparing covering materials that have the compositions shown in Tables 1 and 2, and then extrusion-molding the respective prepared polyvinyl chloride compositions around conductors. Damage resistance, low-temperature embrittlement resistance, low-temperature flexibility, and low-temperature properties after aging of the insulated wire according to Examples 2 to 22 were evaluated in the same manner as in the insulated wire according to Example 1. Smoking properties and workability of the insulated wires according to Examples 2 to 22 were also evaluated.

Comparative Examples 1 to 23

Insulated wires according to Comparative Examples 1 to 23 were prepared in the same manner as the insulated wire according to Example 1, by preparing covering materials that have the compositions shown in Tables 3 and 4, and then extrusion-molding the respective prepared polyvinyl chloride compositions around conductors. Damage resistance, low-temperature embrittlement resistance, low-temperature flexibility, and low-temperature properties after aging of the insulated wire according to Comparative Examples 1 to 23 were evaluated in the same manner as the insulated wire according to Example 1. Smoking properties and workability of the insulated wires according to Comparative Examples 1 to 23 were also evaluated.

Reference Examples 1 and 2

Insulated wires according to Reference Examples 1 and 2 were prepared in the same manner as the insulated wire according to example 1, by preparing covering materials having the compositions shown in Table 2, and then extrusion-molding the respective prepared polyvinyl chloride compositions around conductors. Damage resistance, low-temperature embrittlement resistance, low-temperature flexibility, and low-temperature properties after aging of the insulated wires according to Reference Examples 1 and 2 were evaluated in the same manner as the insulated wire according to Example 1. Smoking properties and workability of the insulated wire according to Reference Examples 1 and 2 were also evaluated.

(Material Used)

Polyvinyl chloride (polymerization degree: 1300) : manuf.: Shin Dai-ichi Vinyl Corporation, trade name: “ZEST1300Z”

Polyvinyl chloride (polymerization degree: 800): manuf.: SHIN DAI-ICHI VINYL CORPORATION, trade name: “ZEST800Z”

Polyvinyl chloride (polymerization degree: 2500): manuf.: SHIN DAI-ICHI VINYL CORPORATION, trade name: “ZEST2500Z”

Noncrystalline chlorinated polyethylene: manuf.: SHOWA DENKO K.K., trade name: “ELASLEN 401A”

Semicrystalline chlorinated polyethylene: manuf.: SHOWA DENKO K.K., trade name: “ELASLEN 404B”

Chlorinated polypropylene: manuf.: NIPPON PAPER CHEMICALS CO., LTD., trade name: “SUPER-CHLON HP-215”

Methyl methacrylate-butadiene-styrene copolymer (MBS resin): manuf.: MITSUBISHI RAYON CO., LTD., trade name: “METABLEN C-223A”

Trimellitate ester: manuf.: DIC CORPORATION, trade name: “W-750”

Pyromellitate ester: manuf.: DIC CORPORATION, trade name: “W-7010”

Phthalateester: manuf.: J-PLUS CO., LTD., trade name: “DUP”

Adipate eater: manuf.: DIC CORPORATION, trade name: “W-242”

Sebacate ester: manuf.: DIC CORPORATION, trade name: “W-280”

Lead-free stabilizer: manuf.: ADEKA CORPORATION, trade name: “RUP-100”

(Procedures of Evaluation)

<Evaluation of Damage Resistance>

Figure 1B:
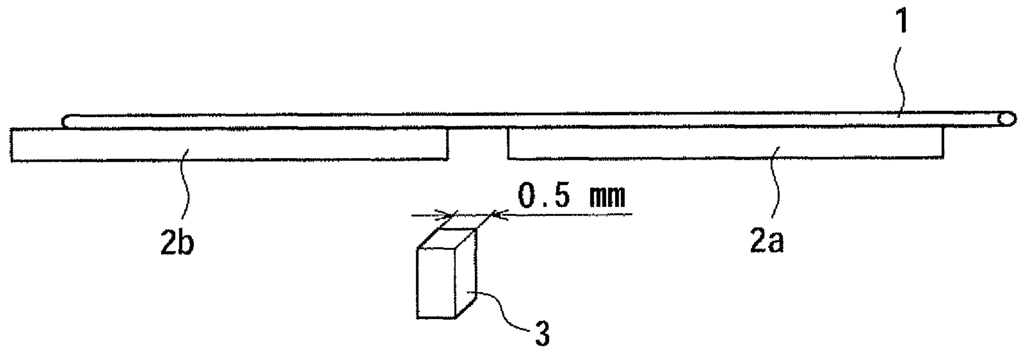

The insulated wires according to Examples, Comparative Examples were cut into test specimens 300 mm long. As shown in FIG. 1(*a*) (a plan view) and FIG. 1(*b*) (a side view), a test specimen 1 was placed on plastic plates 2*a*, 2*b*. The gap between the plastic plate 2*a* and the plastic plate 2*b* was 5 mm. By fixing the left end of the test specimen 1 on the plastic plate 2*b*, and applying a tensile force of 30 N to the right end of the test specimen 1, the test specimen 1 was held straight. Then, a metal piece 3 having a thickness of 0.5 mm was placed at a position that is 1 cm apart from the lower portion of the test specimen 1 placed between the plastic plates 2*a* and the plastic plate 2*b* and approximately 0.8 mm apart in a radial direction from the radial center of the test specimen 1.

Figure 2A:
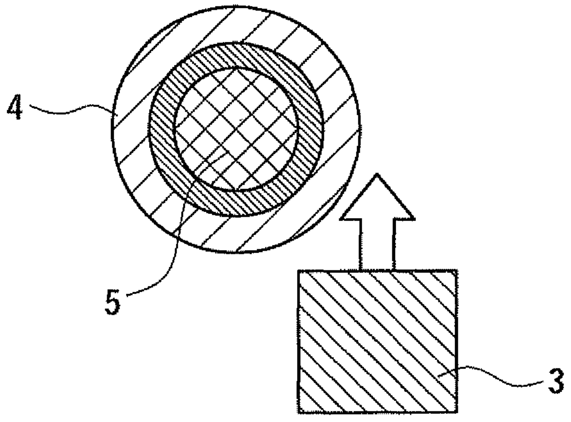
FIG. 2 is a view illustrating a method for evaluating damage resistance.
Figure 2B:
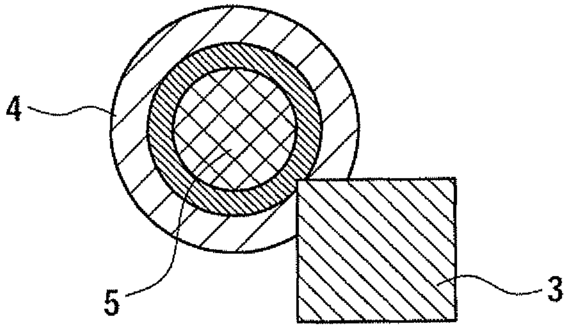
Figure 2C:
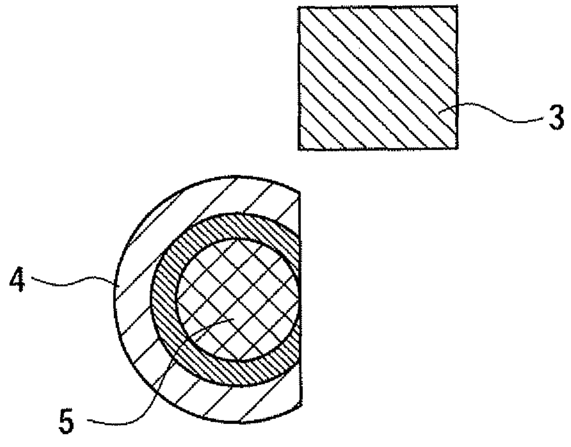

Then, as shown in FIGS. 2(*a*) to 2(*c*), the metal piece 3 was moved upward at a speed of 50 mm/min. in contact with a covering material 4 of the test specimen 1, and an amount of a load applied to the metal piece 3 was measured. While a conductor 5 of the test specimen 1 was not exposed, the metal piece 3 is moved toward the center of the test specimen 1 by a step of 0.01 mm. The measurement was continued until the conductor 5 is exposed. The maximum load with which the conductor is not exposed was defined as a damage resistance ability of the electric wire. The test specimen whose conductor was not exposed with a load of 12 N or more was regarded as good. Further, the test specimen whose conductor was exposed with a load, of 15 N or more was regarded as excellent. On the other hand, the test specimen whose conductor was exposed with a load less than 12 N.

<Evaluation of Low-temperature Embrittlement Resistances>

The insulated wires according to Examples, Comparative Examples, and Reference Examples were cut into test specimens 38 mm long. Each test specimen was attached to a chuck of a testing machine for low-temperature embrittlement resistance test and immersed in a liquid medium kept at a given controlled testing temperature for 2.5±0.5 minutes. Then a temperature of the test specimen was measured, and the test specimen was hit with a striking implement. The lowest temperature of each test specimen at which the test specimen was not broken was determined as a low-temperature embrittlement temperature of the test specimen. The test specimens having low-temperature embrittlement temperatures of −5 to −20° C. were regarded as good, and the test specimens having low-temperature embrittlement temperatures lower than −20° C. were regarded as excellent.

<Evaluation of Low-temperature Flexibility>

Figure 3:
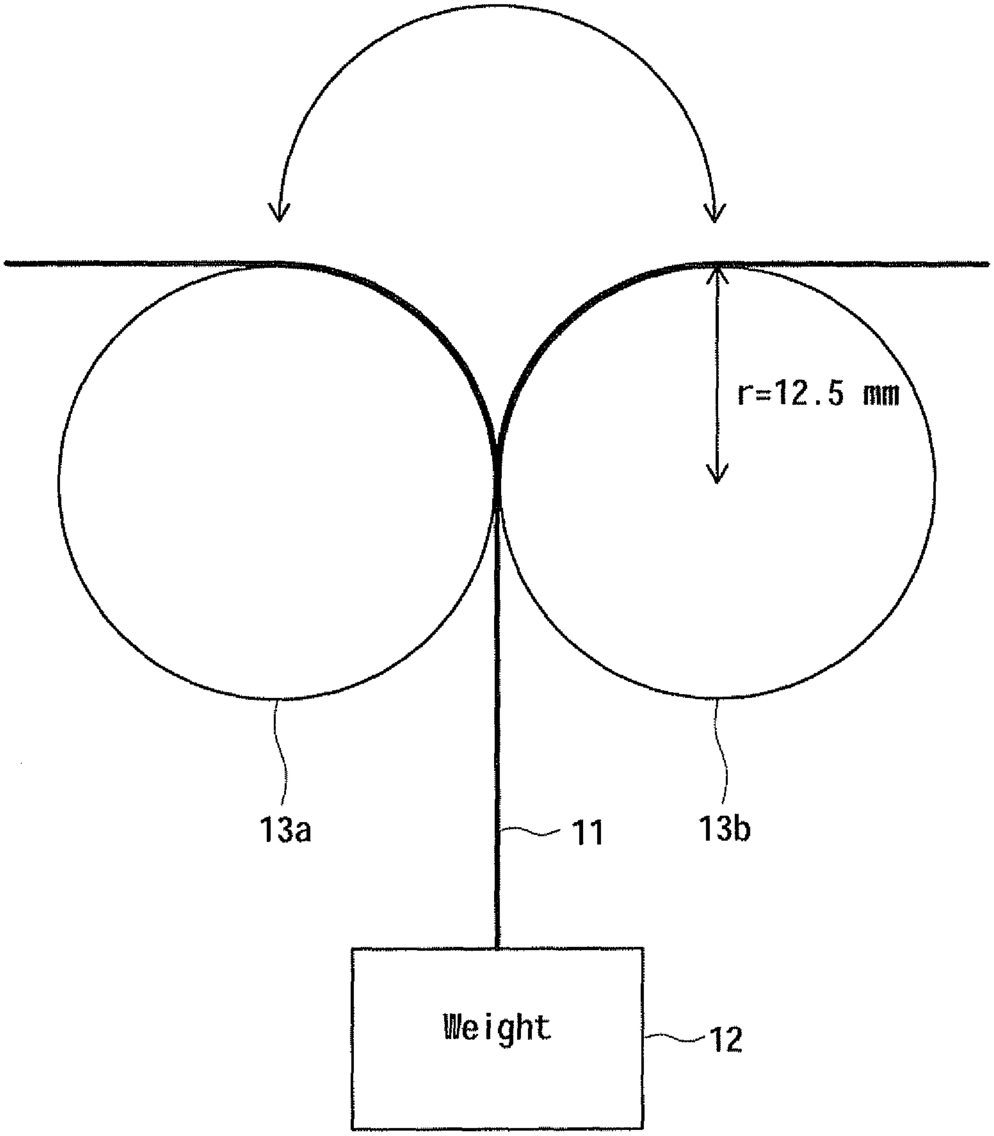
FIG. 3 is a view illustrating a method for evaluating low-temperature flexibility.

The insulated wires according to Examples, Comparative Examples, and Reference Examples were cut into test specimens 350 mm long. 20-mm long pieces of the wire covering at the both ends of each test specimen were stripped off. Subsequently, as shown in FIG. 3, one end of a test specimen 11 was fixed to a rotating arm, a weight 12 was hung with the other end of the test specimen 11, and the test specimen 11 was supported at a middle point in a longitudinal direction thereof between a pair of columnar members 13*a* and 13*b* (each having a radius r of 12.5 mm). Then, the rotating arm was rotated 90 degrees in one direction and 90 degrees in the other direction so that the test specimen 11 went around the perimeters of the columnar members 13*a* and 13*b*, and the test specimen 11 was repeatedly flexed at the radius r. The load that applied to the test specimen 11 was 400 g, the testing temperature was −30° C., and the reciprocation rate of the flexing motion was 30 times/minute. Flexibility of the test specimen was evaluated through the number of reciprocation (flexing number) before the test specimen 11 was broken. The test specimen having a flexing number of 1000 or larger was regarded as good, and the test specimen having a flexing number of 1500 or larger was regarded as excellent.

<Evaluation of Low-temperature Property after Aging>

The insulated wires according to Examples, Comparative Examples, and Reference Examples were cut into test specimens 600 mm long. The test specimens were kept in an oven at 110° C. for 240 hours. Then, the test specimens were each wound three times at a speed of once a second around a mandrel having a diameter 5 times as large as the external diameter of the insulated electric wires at a testing temperature of −25° C. After the winding procedure, the test specimens were returned to room temperature. The test specimens having no cracking or peeling observed on the insulators were regarded as good and test specimens having some cracking or peeling on the insulators were regarded as bad.

<Evaluation of Smoking Property>

An arbitrary amount of an electric current was supplied to the conductor of each of the insulated wires according to Examples, Comparative Examples, and Reference Examples, and the temperature of the conductor at which emission of smoke from the wire covering was observed by visual observation was determined as a smoking temperature of the covering material. The covering materials having smoking temperatures of 160° C. or higher were regarded as good.

<Evaluation of Wire Workability>

It was observed whether or not fringes were formed on the insulated wires according to Examples, Comparative Examples, and Reference Examples when the covering materials at ends of the insulated wires were stripped off. The insulated wires on which fringes were not formed were regarded as good, and the insulated wires on which fringes were observed were regarded as bad.

The contents and results of evaluations of the covering materials according to Examples, Comparative Examples, and Reference Examples are shown in Tables 1 to 4. The values in Tables 1 to 4 are indicated in part by mass.

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| | Polyvinyl chloride (polymerization deg. = 800) | — | — | — | — | — | — | — | — | — | — | — |
| | Polyvinyl chloride (polymerization deg. = 1300) | 100 | 100 | 100 | 100 | 100 | 100 | 100 | 100 | 100 | 100 | 100 |
| | Polyvinyl chloride (polymerization deg. = 2500) | — | — | — | — | — | — | — | — | — | — | — |
| (B) | Noncrystalline chlorinated polyethylene | 4 | 2 | 6 | 2 | 4 | 2 | 2 | 6 | 10 | 8 | 8 |
| | Semicrystalline chlorinated polyethylene | — | — | — | — | — | — | — | — | — | — | — |
| | Chlorinated polypropylene | — | — | — | — | — | — | — | — | — | — | — |
| (C) | MBS resin | 6 | 2 | 6 | 2 | 6 | 2 | 2 | 6 | 2 | 1 | 4 |
| (A) | Trimellitate ester | 20 | 15 | 30 | 30 | — | 15 | 20 | 10 | 30 | 20 | 30 |
| | Pyromellitate ester | — | — | — | — | 20 | — | — | 5 | — | — | — |
| | Phthalate ester | — | — | — | — | — | 5 | 5 | 5 | — | — | — |
| | Adipate ester | — | — | — | — | — | — | — | 5 | — | — | — |
| | Sebacate ester | — | — | — | — | — | — | — | — | — | — | — |
| | Lead-free stabilizer | 5 | 5 | 5 | 5 | 5 | 5 | 5 | 5 | 5 | 5 | 5 |
| | Thickness of insulator (mm) | 200 | 200 | 200 | 200 | 200 | 200 | 200 | 200 | 200 | 200 | 200 |
| | Content of component (B) | 4 | 2 | 6 | 2 | 4 | 2 | 2 | 6 | 10 | 8 | 8 |
| | Total content of components (B) and (C) | 10 | 4 | 12 | 4 | 10 | 4 | 4 | 12 | 12 | 9 | 12 |
| Results | Damage resistance | Excellent | Excellent | Good | Good | Excellent | Good | Good | Good | Good | Excellent | Good |
| | Low-temperature embrittlement resisntance | Excellent | Good | Excellent | Good | Excellent | Good | Good | Excellent | Excellent | Good | Excellent |
| | Low-temperature flexibility | Excellent | Good | Excellent | Good | Excellent | Good | Good | Excellent | Excellent | Good | Excellent |
| | Low-temperature property after aging | Good | Good | Good | Good | Good | Good | Good | Good | Good | Good | Good |
| | Smoking property | Good | Good | Good | Good | Good | Good | Good | Good | Good | Good | Good |
| | Wire workability | Good | Good | Good | Good | Good | Good | Good | Good | Good | Good | Good |

TABLE 2

| | Example | | | | | | | | | | | Reference Example | |
|---|---|---|---|---|---|---|---|---|---|---|---|---|---|
| | 12 | 13 | 14 | 15 | 16 | 17 | 18 | 19 | 20 | 21 | 22 | 1 | 2 |
| Polyvinyl chloride (polymerization deg. = 800) | — | — | — | 100 | 100 | — | — | 100 | 100 | — | — | — | — |
| Polyvinyl chloride (polymerization deg. = 1300) | 100 | 100 | 100 | — | — | — | — | — | — | — | — | 100 | 100 |
| Polyvinyl chloride (polymerization deg. = 2500) | — | — | — | — | — | 100 | 100 | — | — | 100 | 100 | — | — |

TABLE 2-continued

| | | Example | | | | | | | | | | | Reference Example | |
|---|---|---|---|---|---|---|---|---|---|---|---|---|---|---|
| | | 12 | 13 | 14 | 15 | 16 | 17 | 18 | 19 | 20 | 21 | 22 | 1 | 2 |
| (B) | Noncrystalline chlorinated polyethylene | 6 | — | 4 | 2 | 6 | 4 | 6 | — | 1 | 2 | 4 | 2 | 2 |
| | Semicrystalline chlorinated polyethylene | — | — | — | — | — | — | — | 4 | 1 | 2 | — | — | — |
| | Chlorinated polypropylene | — | 2 | 4 | — | — | — | — | — | — | 6 | — | — | 2 |
| (C) | MBS resin | 6 | 2 | 4 | 2 | 6 | 2 | 6 | 6 | 1 | 2 | 4 | 6 | 4 |
| (A) | Trimellitate ester | 10 | 15 | 25 | 25 | 20 | — | 10 | 20 | 15 | — | 15 | 10 | 15 |
| | Pyromellitate ester | 10 | — | — | — | 5 | 15 | 10 | — | 5 | 25 | — | — | — |
| | Phthalate ester | — | — | 5 | — | 5 | — | — | — | — | — | — | — | — |
| | Adipate ester | — | — | — | 5 | — | — | — | — | — | 5 | — | 15 | — |
| | Sebacate ester | 10 | — | — | — | — | — | — | — | — | — | 10 | — | 15 |
| | Lead-free stabilizer | 5 | 3 | 5 | 5 | 7 | 5 | 3 | 5 | 7 | 5 | 5 | 5 | 5 |
| | Thickness of insulator (mm) | 200 | 200 | 200 | 200 | 200 | 200 | 200 | 200 | 200 | 200 | 200 | 200 | 200 |
| | Content of component (B) | 6 | 2 | 8 | 2 | 6 | 4 | 6 | 4 | 2 | 10 | 4 | 2 | 4 |
| | Total content of components (B) and (C) | 12 | 4 | 12 | 4 | 12 | 6 | 12 | 10 | 3 | 12 | 8 | 8 | 8 |
| Results | Damage resistance | Good | Excellent | Good | Good | Good | Excellent | Excellent | Excellent | Excellent | Good | Good | Good | Good |
| | Low-temperature embrittlement resistance | Excellent | Good | Excellent | Good | Excellent | Good | Excellent | Excellent | Good | Excellent | Good | Good | Good |
| | Low-temperature flexibility | Excellent | Good | Excellent | Good | Excellent | Good | Excellent | Excellent | Good | Excellent | Good | Good | Good |
| | Low-temperature property after aging | Good | Good | Good | Good | Good | Good | Good | Good | Good | Good | Good | Good | Good |
| | Smoking property | Good | Good | Good | Good | Good | Good | Good | Good | Good | Good | Good | Bad | Bad |
| | Wire workability | Good | Good | Good | Good | Good | Good | Good | Good | Good | Good | Good | Good | Good |

TABLE 3

| | | Comparative Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| | Polyvinyl chloride (polymerization deg. = 800) | — | — | — | — | — | — | — | 100 | — | 100 | — | — |
| | Polyvinyl chloride (polymerization deg. = 1300) | 100 | 100 | 100 | 100 | 100 | 100 | 100 | — | — | — | — | 100 |
| | Polyvinyl chloride (polymerization deg. = 2500) | — | — | — | — | — | — | — | — | 100 | — | 100 | — |
| (B) | Noncrystalline chlorinated polyethylene | — | — | 6 | — | 6 | — | 1 | 4 | 6 | 2 | 4 | 4 |
| | Semicrystalline chlorinated polyethylene | | | | | | | | | | | | |
| | Chlorinated polypropylene | — | — | — | 8 | 8 | 12 | 1 | — | — | 2 | — | — |
| (C) | MBS resin | — | — | — | — | — | — | — | 10 | 6 | 8 | 8 | 8 |
| (A) | Trimellitate ester | 30 | 15 | 15 | 15 | 15 | 15 | 30 | 15 | 10 | 15 | 25 | 25 |
| | Pyromellitate ester | — | — | — | — | — | — | — | — | — | — | — | — |
| | Phthalate ester | — | — | — | — | — | — | — | — | — | — | — | — |
| | Adipate ester | — | — | — | — | — | — | — | — | — | — | 5 | — |
| | Sebacate ester | — | — | — | — | — | — | — | — | — | 5 | — | — |
| | Lead-free stabilizer | 5 | 5 | 5 | 5 | 5 | 5 | 5 | 5 | 5 | 5 | 5 | 5 |
| | Thickness of insulator (mm) | 200 | 200 | 200 | 200 | 200 | 200 | 200 | 200 | 200 | 200 | 200 | 200 |
| | Content of component (B) | — | — | 6 | 8 | 14 | 12 | 2 | 4 | 6 | 4 | 4 | 4 |
| | Total content of components (B) and (C) | — | — | 6 | 8 | 14 | 12 | 2 | 14 | 12 | 12 | 12 | 12 |

TABLE 3-continued

| | | Comparative Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Results | Damage resistance | Bad | Good | Good | Good | Bad | Bad | Bad | Bad | Good | Good | Good | Good |
| | Low-temperature embrittlement resistance | Bad | Bad | Bad | Bad | Good | Bad | Good | Good | Bad | Good | Excellent | Excellent |
| | Low-temperature flexibility | Bad | Bad | Bad | Bad | Good | Good | Bad | Good | Bad | Good | Excellent | Excellent |
| | Low-temperature property after aging | Good | Good | Good | Good | Good | Good | Good | Bad | Good | Bad | Bad | Bad |
| | Smoking property | Good | Good | Good | Good | Good | Good | Good | Good | Good | Good | Good | Good |
| | Wire workability | Good | Good | Good | Good | Good | Good | Good | Good | Bad | Good | Good | Good |

TABLE 4

| | | Comparative Example | | | | | | | | | | |
|---|---|---|---|---|---|---|---|---|---|---|---|---|
| | | 13 | 14 | 15 | 16 | 17 | 18 | 19 | 20 | 21 | 22 | 23 |
| | Polyvinyl chloride (polymerization deg. = 800) | — | — | — | 100 | — | — | 100 | — | — | — | — |
| | Polyvinyl chloride (polymerization deg. = 1300) | 100 | 100 | 100 | — | 100 | — | — | 100 | 100 | 100 | 100 |
| | Polyvinyl chloride (polymerization deg. = 2500) | — | — | — | — | — | 100 | — | — | — | — | — |
| (B) | Noncrystalline chlorinated polyethylene | 2 | — | — | — | — | — | 1 | 4 | 4 | 4 | 4 |
| | Semicrystalline chlorinated polyethylene | — | — | — | — | — | — | — | — | — | — | — |
| | Chlorinated polypropylene | | | | | | | | | | | |
| (C) | MBS resin | 2 | — | 2 | 10 | 10 | 12 | 6 | 8 | 8 | 8 | 8 |
| (A) | Trimellitate ester | 30 | 15 | 15 | 15 | 10 | 15 | 15 | 15 | 10 | 15 | 15 |
| | Pyromellitate ester | — | — | — | — | 5 | — | — | — | 15 | — | — |
| | Phthalate ester | 5 | — | — | — | 5 | — | — | — | — | — | — |
| | Adipate ester | — | 5 | 10 | — | — | 5 | — | — | — | 10 | |
| | Sebacate ester | — | 5 | — | — | — | 5 | — | — | — | | 10 |
| | Lead-free stabilizer | 5 | 3 | 5 | 7 | 8 | 5 | 5 | 5 | 5 | 7 | 5 |
| | Thickness of insulator (mm) | 200 | 200 | 200 | 200 | 200 | 200 | 200 | 200 | 200 | 200 | 200 |
| | Content of component (B) | 2 | — | — | — | — | — | 1 | 4 | 4 | 4 | 4 |
| | Total content of components (B) and (C) | 4 | — | 2 | 10 | 10 | 12 | 7 | 12 | 12 | 12 | 12 |
| Results | Damage resistance | Bad | Good | Good | Bad | Bad | Bad | Good | Good | Good | Good | Good |
| | Low-temperature embrittlement resistance | Good | Bad | Bad | Good | Good | Good | Bad | Good | Excellent | Excellent | Excellent |
| | Low-temperature flexibility | Good | Bad | Bad | Good | Good | Good | Bad | Good | Excellent | Excellent | Excellent |
| | Low-temperature property after aging | Good | Good | Good | Bad | Bad | Bad | Good | Bad | Bad | Bad | Bad |
| | Smoking property | Good | Bad | Good | Good | Good | Good | Good | Good | Good | Good | Good |
| | Wire workability | Good | Good | Good | Good | Good | Good | Good | Good | Good | Good | Good |

The covering materials according to Comparative Examples 1, 2, and 14 are inferior in at least one of damage resistance, low-temperature embrittlement resistance, low-temperature flexibility, and low-temperature property after aging because the covering materials, which contain the polyvinyl chloride and the component (A), do not contain either the component (B) or the component (C).

The covering materials according to Comparative Examples 3 to 7 are inferior in at least one of damage resistance, low-temperature embrittlement resistance, low-temperature flexibility, and low-temperature property after aging because the covering materials, which contain the polyvinyl chloride and the component (A), do not contain the component (C).

The covering materials according to Comparative Examples 15 to 18 are inferior in at least one of damage resistance, low-temperature embrittlement resistance, low-temperature flexibility, and low-temperature property after aging because the covering materials, which contains the polyvinyl chloride and the component (A), do not contain the component (B).

The covering material according to Comparative Example 6 is inferior in damage resistance because the covering material contains more than 10 parts by mass of the component (B) with respect to 100 parts by mass of the polyvinyl chloride. The covering material according to Comparative Example 19 is inferior in low-temperature embrittlement resistance and low-temperature flexibility because the covering material contains less than 2 parts by mass of the component (B) with respect to 100 parts by mass of the polyvinyl chloride.

The covering materials according to Comparative Examples 8, 10 to 12, 16 to 18, and 20 to 23 are inferior in low-temperature property after aging because the covering materials contain more than 6 parts by mass of the component (C) with respect to 100 parts by mass of the polyvinyl chloride. Among them, the covering materials according to Comparative Examples 8 and 16 to 18 are inferior also in damage resistance because the covering materials contain more than 8 parts by mass of the component (C) with respect to 100 parts by mass of the polyvinyl chloride.

The covering materials according to Comparative Examples 5 and 8 are inferior in damage resistance because the covering materials contain more than 12 parts by mass of the component (B) and the component (C) in total with respect to 100 parts by mass of the polyvinyl chloride. The covering materials according to Comparative Examples 7 and 15 are inferior in low-temperature embrittlement resistance or low-temperature flexibility because the covering materials contain less than 3 parts by mass of the component (B) and the component (C) in total with respect to 100 parts by mass of the polyvinyl chloride.

The covering material according to Comparative Example 9 is inferior in low-temperature embrittlement resistance, low-temperature flexibility, and wire workability because the component (A) of the covering material includes less than 15 parts by mass of the trimellitate plasticizer and the pyromellitate plasticizer in total with respect to 100 parts by mass of the polyvinyl chloride. The covering material according to Comparative Example 13 is inferior in damage resistance because the covering material includes more than 30 parts by mass of the component (A) with respect to 100 parts by mass of the polyvinyl chloride.

In contrast to the covering materials according to Comparative Examples, the covering materials according to Examples have sufficient damage resistance, low-temperature embrittlement resistance, low-temperature flexibility, and low-temperature properties after aging simultaneously.

In addition, a covering material that contains more than 10 parts by mass of an aliphatic plasticizer, which is not a trimellitate plasticizer or a pyromellitate plasticizer, such as the covering materials according to Reference Examples 1 and 2 is inferior in smoking property.

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

The invention claimed is:

1. A covering material for electric wire containing a polyvinyl chloride, the covering material comprising, with respect to 100 parts by mass of the polyvinyl chloride:

(A) 15 to 30 parts by mass of a plasticizer comprising 15 parts by mass or more of one or more plasticizers selected from trimellitate plasticizers and pyromellitate plasticizers;

(B) 2 to 10 parts by mass of a chlorinated polyolefin; and (C) 1 to 6 parts by mass of a methyl methacrylate-butadiene-styrene copolymer, wherein:

a total amount of the component (B) and the component (C) is 3 to 12 parts by mass.

2. The covering material according to claim 1, wherein the component (A) comprises 10 parts by mass or less of an aliphatic plasticizer with respect to 100 parts by mass of the polyvinyl chloride.

3. The covering material according to claim 1, wherein the component (A) comprises 10 parts by mass or less of one or more plasticizers selected from phthalate plasticizers and aliphatic plasticizers with respect to 100 parts by mass of the polyvinyl chloride.

* * * * *